(12) United States Patent
Dahlgren

(10) Patent No.: US 7,618,007 B1
(45) Date of Patent: Nov. 17, 2009

(54) FORCE BALANCING ACTUATOR

(75) Inventor: Carl A. Dahlgren, Seattle, WA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 225 days.

(21) Appl. No.: 11/370,380

(22) Filed: Mar. 6, 2006

(51) Int. Cl.
*B64D 27/00* (2006.01)

(52) U.S. Cl. .......................................... 244/54

(58) Field of Classification Search .................... 244/54, 244/118.5, 131, 135 R, 58
See application file for complete search history.

(56) References Cited

U.S. PATENT DOCUMENTS

| | | | |
|---|---|---|---|
| 2,028,549 A | 1/1936 | Lord | |
| 2,395,143 A | 2/1946 | Prewitt | |
| 2,718,756 A | 9/1955 | McDowall | |
| 2,724,948 A | 11/1955 | Hiscock et al. | |
| 3,057,582 A * | 10/1962 | Kerry | .......................... 244/56 |
| 3,168,270 A | 2/1965 | Bligard et al. | |
| 3,190,591 A | 6/1965 | Bligard et al. | |
| 3,288,404 A | 11/1966 | Schmidt et al. | |
| 4,044,973 A | 8/1977 | Moorehead | |
| 4,717,094 A | 1/1988 | Chee | |
| 7,063,290 B2 * | 6/2006 | Marche | ........................ 244/54 |

FOREIGN PATENT DOCUMENTS

GB              606444              10/1945

* cited by examiner

*Primary Examiner*—Michael Carone
*Assistant Examiner*—Michael Kreiner
(74) *Attorney, Agent, or Firm*—AFMCLO/JAZ; William G. Auton; Christopher J. Menke

(57) ABSTRACT

There is provided a force balancing actuator for mounting a pressure vessel, containing an engine, to aircraft structure. The force balancing actuator includes a cylinder and piston that is mechanically connected between the pressure vessel and aircraft structure. This piston and cylinder adjustably provides force there between in response to variations in differential pressure between the pressurized cabin and ambient pressure. The cylinder and piston thereby relieves excessive load on engine isolators allowing the isolators to absorb engine vibrations.

1 Claim, 3 Drawing Sheets

FORCE BALANCING ACTUATOR

STATEMENT OF GOVERNMENT INTEREST

The invention described herein may be manufactured and used by or for the Government for governmental purposes without the payment of any royalty thereon.

BACKGROUND OF THE INVENTION

The invention relates generally to aircraft engine mounting systems, and more specifically, it relates to a force balancing actuator to mount a pressure vessel, containing an engine, to aircraft structure.

Recent developments in Advanced Surveillance aircraft require more electrical power than is available from the standard transport aircraft systems. Upgrading a standard transport aircraft for advanced surveillance can require installation of additional or supplementary power for electrical generation. Supplemental power is provided by an air breathing engine installed inside the cabin of the aircraft with inlet and exhaust air plumbed to the outside of the aircraft. The engine is installed inside a pressure vessel that maintains the exterior ambient pressure consistent with the inlet and exhaust. Installing supplemental power inside the cabin without adding excessive weight, excessive volume or transmitting excessive noise and vibration to the crew cabin is the objective.

Patented art of interest includes the following U.S. Patents, the disclosures of which are incorporated herein by reference:

U.S. Pat. No. 4,717,094 issued to Wan T. Chee;

U.S. Pat. No. 4,044,973 issued to Moorehead;

U.S. Pat. No. 3,190,591, granted Jun. 22, 1965, to E. J. Bligard et al.

U.S. Pat. No. 2,724,948, granted Nov. 29, 1955, to G. H. Hiscock et al.

U.S. Pat. No. 2,718,756, granted Sep. 27, 1955, to C. J. McDowall.

The Chee patent describes an Aircraft engine mount system with vibration isolators for mounting jet engines on aircraft and for dampening engine vibrations and, more particularly, to an apparatus that includes elastomeric elements for independently dampening vertical and lateral vibrations which elements are located in a relatively cool strut area to protect them from the heat of the turbine section of the engine.

U.S. Pat. No. 3,190,591, granted Jun. 22, 1965, to E. J. Bligard et al., discloses a core assembly for a forward mount structure for an aircraft engine. U.S. Pat. No. 4,044,973, granted Aug. 30, 1977, to J. R. Moorehead, discloses a forward aircraft engine mount structure having elastomeric mounting pads located close to the engine fan casing. U.S. Pat. Nos. 2,395,143, granted Feb. 19, 1946, to R. H. Prewitt; and 3,288,404, granted Nov. 29, 1966, to W. E. Schmidt et al., disclose cushion mounts for helicopter engines. Schmidt et al. state that, in their system, equal spring rates in all directions perpendicular to the longitudinal axis of the engine are required. U.S. Pat. No. 2,028,549, granted Jan. 21, 1936, to H. C. Lord, discloses a cushioned mount for an automobile engine.

British Patent Specification No. 606,444, dated Aug. 13, 1948, in the name of Lord Manufacturing Company, discloses an aft ring mount for a propeller driven aircraft. A plurality of pins are spaced around the ring and are oriented parallel to the engine axis. Each pin has an elastomeric sleeve and two rubber washers positioned at the axial ends of the sleeves. The sleeves carry torque and longitudinal loads in shear and lateral and vertical loads in compression. The washers act as snubbers to prevent excessive movement in the longitudinal direction.

U.S. Pat. No. 2,724,948, granted Nov. 29, 1955, to G. H. Hiscock et al., discloses a mount system for a gas turbine aircraft engine in which four mounting units are spaced around the engine. The units are positioned inside the engine nacelle between the engine compressor and the nacelle firewall. Each of the four units includes a cushion of alternating disks of metal and resilient material. A casing surrounds each cushion and cooling air is conveyed through the casing to provide a heat barrier between the cushion and the hot region of the engine casing in which the mounting unit is located.

U.S. Pat. No. 3,168,270, granted Feb. 2, 1965, to E. J. Bligard et al., discloses an aft mount for a turbojet engine. The mount includes pivot means for allowing the engine to pivot about a laterally-extending axis to accommodate thermal expansion of the engine. Elastometric elements are positioned around a rigid core in a housing positioned below the pivot axis. The elastomeric elements carry torque and longitudinal loads in shear and vertical and lateral loads in tension and compression. Apparently, the elements above and below the core are independent of the elements at the sides of the core. Bligard et al. state that the stiffness characteristics about three axes were tested at a temperature of 125 [deg] F.

U.S. Pat. No. 2,718,756, granted Sep. 27, 1955, to C. J. McDowall, discloses a rear mount for a propeller gas turbine engine. The engine and engine mount are pivotable relative to the aircraft about a laterally extending pivot axis defined by a connecting bolt. An elastomeric sleeve surrounds the bolt and is positioned between the bolt and the engine mount. No other cushioning elements for the rear mount are disclosed.

The above patent and the prior art that is discussed and/or cited therein should be studied for the purpose of putting the present invention into proper perspective relative to the prior art.

Standard design practice is to provide flexible features in the inlet and exhaust ducts to avoid excess constraint loads between the airframe and the ducts when the airplane flexes under flight loads. A consequence of flexible features on the inlet and exhaust is an imbalance of pressure forces on the pressure vessel. The area of the inlet and exhaust ducts react exterior pressure the rest of the vessel react the higher cabin pressure. This force imbalance is significant and can be several times greater than the weight of the engine, even when using vibration isolators.

SUMMARY OF THE INVENTION

This invention includes a force balancing actuator as a component in the mounting system for a pressure vessel vented to external ambient pressure and installed inside a pressurized compartment inside an aircraft. In one embodiment the actuator includes a cylinder and piston that is attached on one end to the pressure vessel and the other to the aircraft structure. By venting one side of the piston to external ambient pressure and the other side to the pressurized cabin a force is produced that can balance the unbalanced forces generated on the pressure vessel by the difference between or variation between cabin and ambient pressure that act across the inlet and exhaust duct cross section areas passively cancel the negative effect the imbalance without the use of a control system or pressure regulating device.

DETAILED DESCRIPTION OF THE PREFERRED EMBODIMENT

Figure 1:
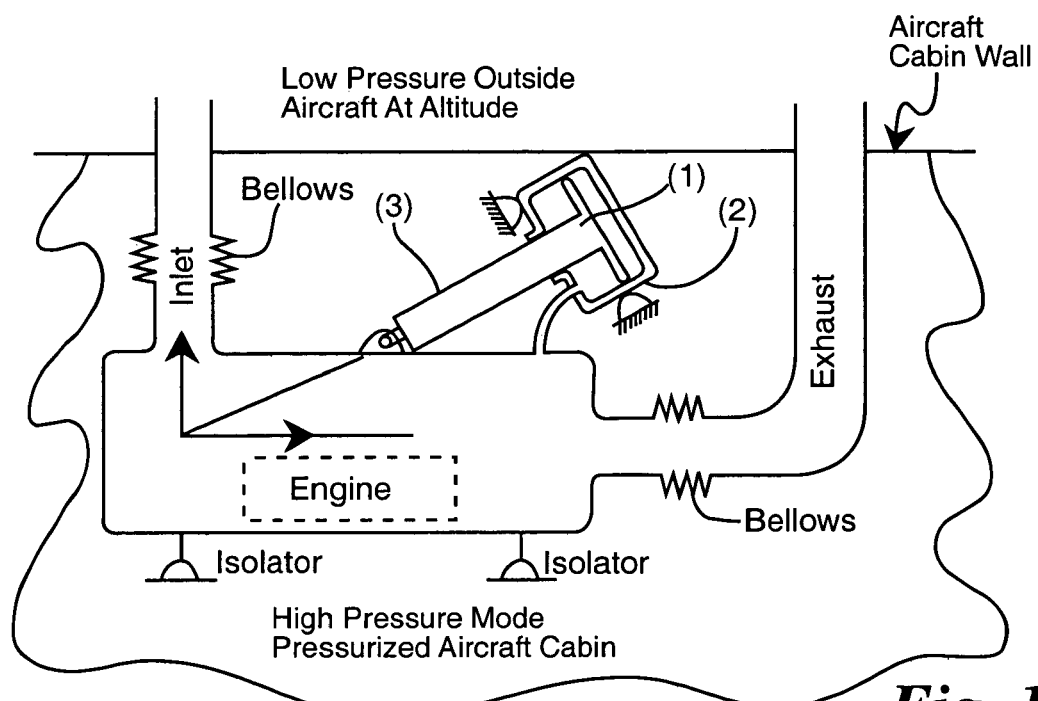
FIGS. 1 and 2 illustrate the force balancing actuator piston.

The present invention is a force balancing actuator to mount a pressure vessel to aircraft structure. The pressure vessel contains an engine that breathes external air and is installed inside the pressure vessel. Standard design practice for mounting engines on the fuselage structure is to use vibration isolators. Vibration isolators absorb the vibration energy produced by the engine and reduce the vibration and noise that is transmitted into the airframe and avoids excessive noise transmission to the crew or passengers areas. Engine noise can be very high and if adequate isolation is not achieved the resulting noise levels at the crew or passenger location can to unhealthy or detrimental to communication and performance.

Configuration 1 and 2 describe conventional engineering design.

Configuration #1 is described below this configuration reacts the pressure imbalance force without deleterious effects. Unfortunately it is large and heavy:

If the vibration isolators are used to attach the engine to the inside of the pressure vessel and the pressure vessel is hard mounted to the airframe the hard mounting can react the pressure force imbalance produced by the inlet and exhaust areas. This allows the isolators to react only the mass of the engine and provide appropriate noise and vibration isolation. The issue with this configuration is excessive size and weight because the pressure vessel must be large enough to accommodate isolation mounts, must be strong enough to react all the mount loads, there must be a second mounting system to mount the vessel to the aircraft and all the connections between the pressure vessel and the engine must be flexible to accommodate the motion of the engine relative to the pressure vessel as the soft isolators deflect to absorb vibration and inertia forces. Configuration #2 described below does not react the pressure imbalance force without deleterious effects. Unfortunately the vibration isolators are preloaded and stiff and will have compromised performance:

A more effective configuration is to hard mount the pressure vessel to the engine with the isolators attaching the pressure vessel directly to the aircraft. This configuration allows the vessel to be much smaller, lighter, eliminates the second mounting system, and eliminates relative motion between the vessel and the engine. Without the relative motion the connections to the engine can be much less flexible which leads to lower cost, less complex, less weight and fewer parts. This configuration reacts the pressure imbalance force through the isolators and requires isolators that are sized support both the mass and significant pressure imbalance force. These isolators will be preloaded from the pressure imbalance loads and may also be significantly stiffer than isolators sized for only the mass of the engine. As a result the performance of the isolators will be degraded and excessive vibration and noise can be transmitted to the airframe.

This invention adds a device that produces a force on the pressure vessel that is equal in magnitude to the pressure imbalance force and acting in the opposite direction. By balancing the "pressure imbalance force" its effective load transfer into the Airframe is cancelled and deleterious loads on the mounting system are not experienced. By adding the force balancing actuator the benefits of configuration 2 are enjoyed without the loss in vibration isolation performance.

This invention adds a force balancing actuator to configuration #2. The pressure acting on the piston [1] produces a force on the piston that offsets the pressure imbalance force. Motion of the piston does not generate any additional force on the airframe and the motion of vibration is not transmitted to the airframe.

As mentioned above, this invention adds a force balancing actuator to configuration #2. The actuator is pneumatic and actuated by the pressure differential between the cabin and the interior pressure vessel (approximately outside air pressure). When we size the actuator to produce the same amplitude force as the pressure imbalance force and align the actuator line of action with the pressure imbalance force vector we can balance the force and cancel any deleterious loads on the mounting system. Since the actuator is actuated by the same pressure differential that is producing the pressure imbalance force the system does not require active control. As altitude changes the actuation force will change the same as the pressure imbalance and will always balance the undesirable imbalance force.

Figure 2:
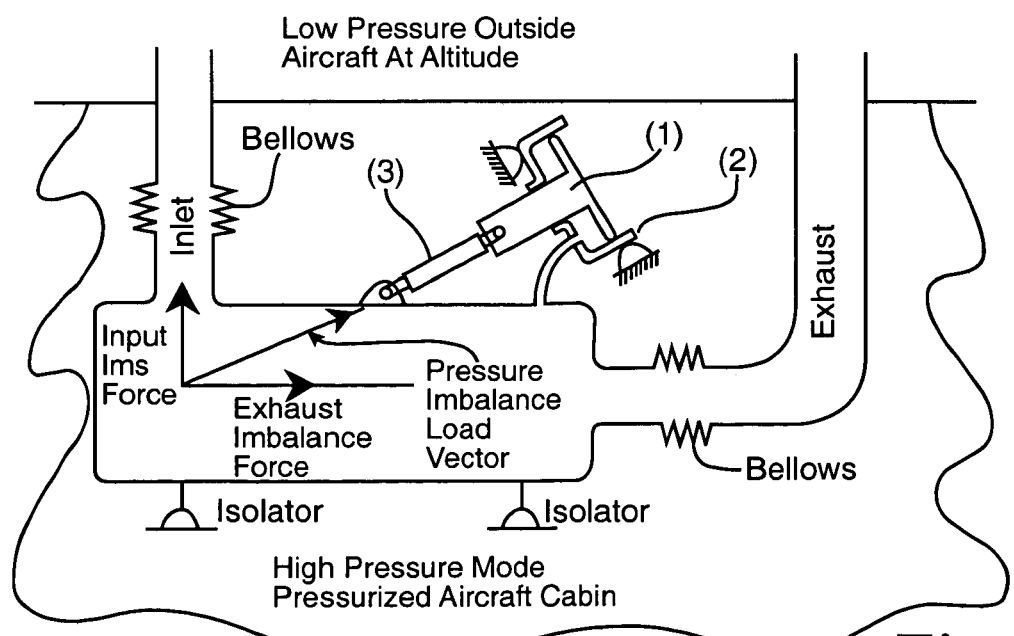

As shown in FIG. 2, the pressure acting on the piston [1] produces a force on the piston and link [3] that offsets the pressure imbalance force. The link [3] allows the pressure vessel to move on the isolators in any direction perpendicular the axis of the link without significant resistance. The link has spherical bearings at both ends to allow unrestrained lateral motion. The piston allows the pressure vessel to move along the axis of the piston without resistance because its force is balanced by the pressure imbalance force and no significant additional force is generated due to motion. Motion along the axis of the piston does not generate any additional force on the airframe and the motion of vibration is not transmitted to the airframe. Since no significant force is generated due to vibration motion vibration load are not induced on the airframe through the actuator.

FIG. 2 illustrates the [1] force balance actuator piston, [2] the force balance actuator body, and [3] the force balance actuator link. When the pressure imbalance force is large the piston required is also large due to the low differential pressure between the cabin and outside air pressure. The actuator is not heavy because the low pressures will allow construction from lightweight materials and thin cross sections as compared to rather heavy hydraulic actuators. Space limitations may require alternate packaging and force multiplying configurations as illustrated below.

Figure 3:
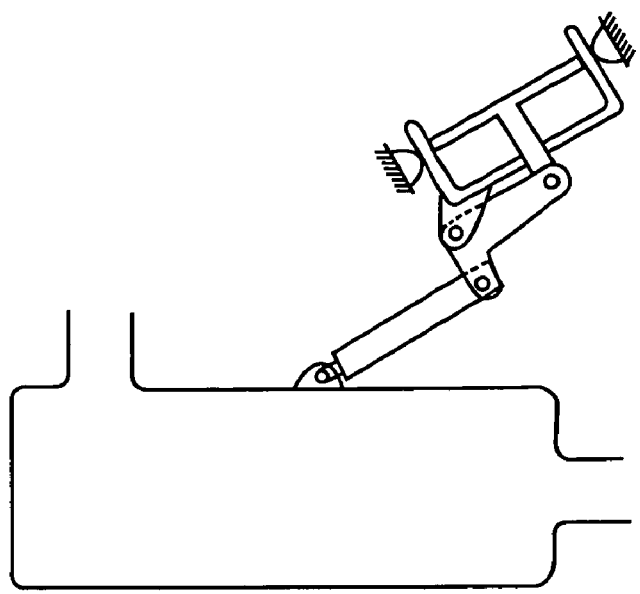
FIG. 3 is an example of a mechanical force multiplying configuration.

FIG. 3 shows an example of mechanical force multiplying configuration.

Figure 4:
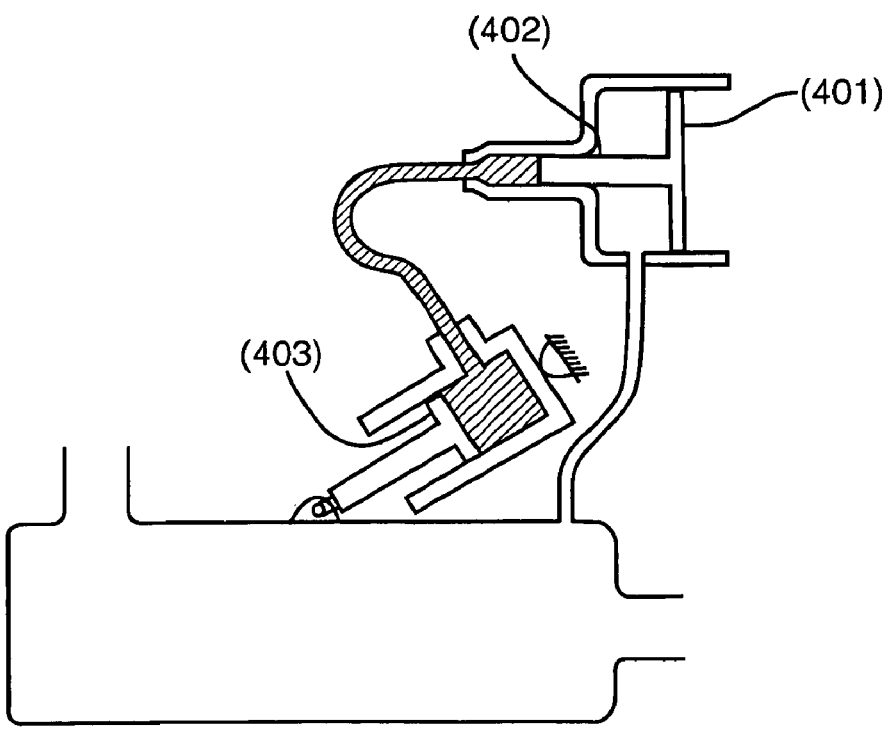
FIG. 4 is an example of a hydraulic force multiplying configuration.

FIG. 4 shows an example of hydraulic force multiplying configuration. In FIG. 4 we see that drive piston [402], is smaller than force piston [403], and provides force multiplication and allows air piston [401] to be smaller and allows the piston [401] and piston [402] assembly to be mounted remote from piston [403].

While the invention has been described in its presently preferred embodiment it is understood that the words which have been used are words of description rather than words of limitation and that changes within the purview of the appended claims may be made without departing from the scope and spirit of the invention in its broader aspects.

Figure 5:
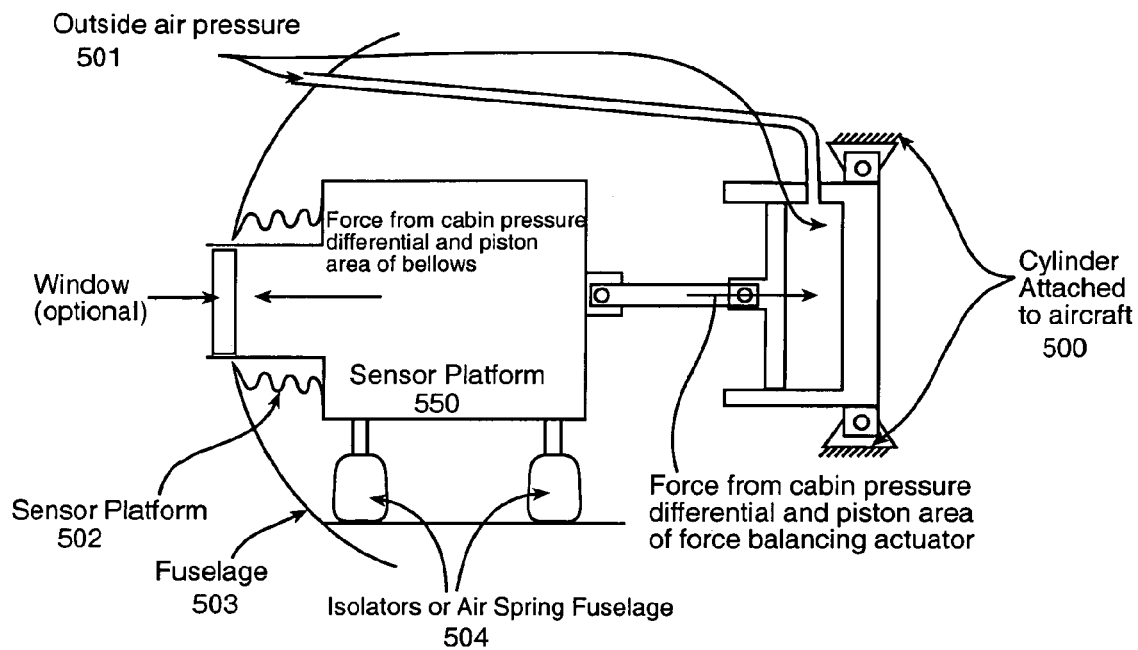
FIG. 5 is an example of the use of the invention as a force balancing actuator that balances pressure forced in isolators or air springs.

FIG. 5 shows another use of the force balancing actuator. More specifically, balancing pressure forces allows isolators or air springs 504 to be at a very low stiffness thus improving isolation of the sensor platform 550 from aircraft vibration in the fuselage 503 and improves sensor performance and accuracy. The vibration isolators 504 are like those used in the engine mounting system of the Chee patent. The invention adds the force balancing actuator of FIGS. 1-3, which has the force balancing actuator piston (1) force balancing cylinder body (2) and force balancing actuator link (3) to balance out the pressure forces on the sensor platform 550 of FIG. 5.

What is claimed is:

1. In combination with a pressure vessel which houses a combustion engine, an engine mounting system for mounting the pressure vessel to an aircraft structure, said engine mounting system comprising:

a primary mounting system of vibration isolators that are mechanically connected between the pressure vessel and the aircraft structure to cushion and neutralize vibrations therebetween;

a secondary mounting system including a pneumatic force balancing actuator which is mounted between the pressure vessel and aircraft structure to balance pressure differences therebetween, wherein said pneumatic force balancing actuator includes a cylinder which is mounted to the aircraft structure, and which has a hollow interior pneumatically connected to the exterior of an aircraft such that the cylinder maintains an internal pressure that equals an ambient pressure outside the aircraft; and a piston which is mounted within the cylinder and connected to the pressure vessel, said piston describing a cavity that is pneumatically connected to the aircraft's interior such that the aircraft's cabin pressure is a driving force on the piston such that the driving force of the piston and internal pressure of the cylinder cushions the pressure vessel with a differential pressure between the cabin pressure and the ambient pressure.

* * * * *

UNITED STATES PATENT AND TRADEMARK OFFICE
CERTIFICATE OF CORRECTION

PATENT NO.         : 7,618,007 B1
APPLICATION NO. : 11/370380
DATED              : November 17, 2009
INVENTOR(S)        : Carl A. Dahlgren Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 481 days.

Signed and Sealed this

Nineteenth Day of October, 2010

David J. Kappos
*Director of the United States Patent and Trademark Office*